United States Patent
Mathon et al.

(10) Patent No.: US 9,512,730 B2
(45) Date of Patent: Dec. 6, 2016

(54) METHOD FOR MANUFACTURING A TURBINE ENGINE PART BY INJECTION OF RESIN UNDER PRESSURE

(71) Applicant: SNECMA, Paris (FR)

(72) Inventors: Richard Mathon, Brunoy (FR); Dominique Magnaudeix, Yerres (FR)

(73) Assignee: SNECMA, Paris (FR)

(*) Notice: Subject to any disclaimer, the term of this patent is extended or adjusted under 35 U.S.C. 154(b) by 762 days.

(21) Appl. No.: 13/856,740

(22) Filed: Apr. 4, 2013

(65) Prior Publication Data
US 2013/0294924 A1 Nov. 7, 2013

(30) Foreign Application Priority Data

Apr. 5, 2012 (FR) ...................... 12 53147

(51) Int. Cl.
| | |
|---|---|
| B29C 70/48 | (2006.01) |
| F01D 5/28 | (2006.01) |
| B29C 45/27 | (2006.01) |
| B29C 33/44 | (2006.01) |
| B29C 45/14 | (2006.01) |
| B29C 70/54 | (2006.01) |

(52) U.S. Cl.
CPC ............... *F01D 5/28* (2013.01); *B29C 33/44* (2013.01); *B29C 45/2711* (2013.01); *B29C 70/48* (2013.01); *B29C 45/14786* (2013.01); *B29C 70/548* (2013.01); *B29C 2045/2714* (2013.01)

(58) Field of Classification Search
CPC .................................. B29C 70/48; B29C 33/44
See application file for complete search history.

(56) References Cited

U.S. PATENT DOCUMENTS

| | | | | |
|---|---|---|---|---|
| 3,970,732 A | * | 7/1976 | Slaats ................ | B29C 44/3403 264/101 |
| 5,236,321 A | * | 8/1993 | Newton ............. | B29C 33/0061 264/258 |
| 5,855,709 A | * | 1/1999 | Bocoviz ................ | B29C 70/48 156/308.2 |
| 2007/0092379 A1 | | 4/2007 | Coupe et al. | |

(Continued)

FOREIGN PATENT DOCUMENTS

| | | |
|---|---|---|
| FR | 1 520 113 | 4/1968 |
| FR | 2 892 339 | 4/2007 |

(Continued)

OTHER PUBLICATIONS

French Preliminary Search Report issued Jan. 4, 2013, in Patent Application No. FR 1253147 (FA 765685) (With English translation of Category of Cited Documents).

*Primary Examiner* — Matthew Daniels
(74) *Attorney, Agent, or Firm* — Oblon, McClelland, Maier & Neustadt, L.L.P.

(57) ABSTRACT

A method for manufacturing a thick turbine engine part in a composite material by injection of resin under pressure. A fiber preform is positioned in a mold, a resin composition is injected into the mold, the resin composition is polymerized in the mold so as to obtain the part, and the part is removed from the mold. Prior to the injection of the resin composition, a mold release shim is inserted between the fibrous preform and a wall of the mold, and between the polymerization of the resin composition and the removal of the part from the mold, the mold release shim is extracted.

7 Claims, 4 Drawing Sheets

(56) References Cited

U.S. PATENT DOCUMENTS

| | | |
|---|---|---|
| 2009/0218734 A1 | 9/2009 | Eberth et al. |
| 2012/0018918 A1 | 1/2012 | Eberth et al. |
| 2012/0067511 A1* | 3/2012 | Chase ................... B29C 70/443 |
| | | 156/243 |
| 2012/0267039 A1 | 10/2012 | Dambrine et al. |

FOREIGN PATENT DOCUMENTS

| | | |
|---|---|---|
| JP | 7-195463 | 8/1995 |
| WO | WO 01/17012 | 3/2001 |
| WO | WO 2007/054315 A1 | 5/2007 |
| WO | WO 2010/050101 A1 | 5/2010 |
| WO | WO 2011/036380 A1 | 3/2011 |

* cited by examiner

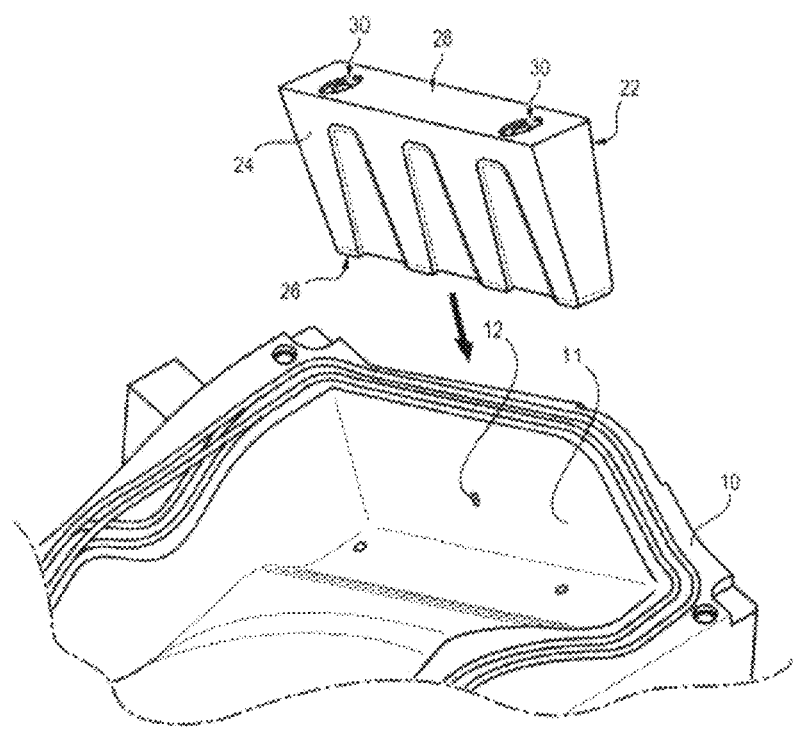

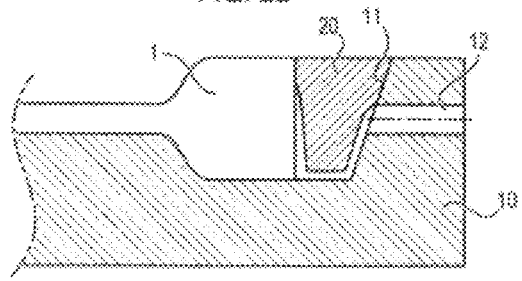
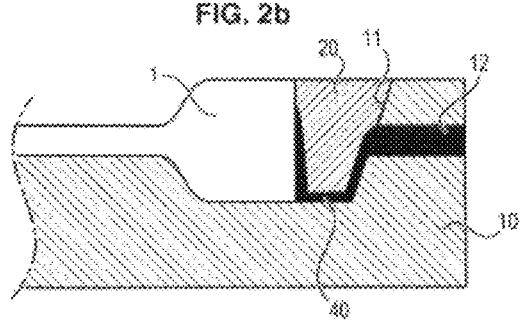
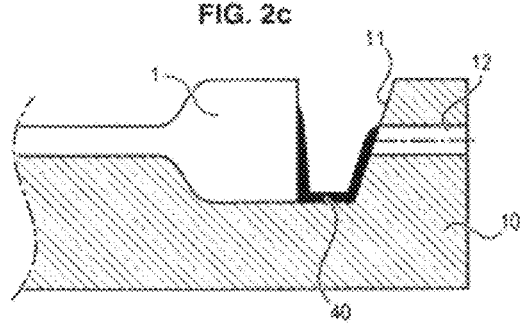

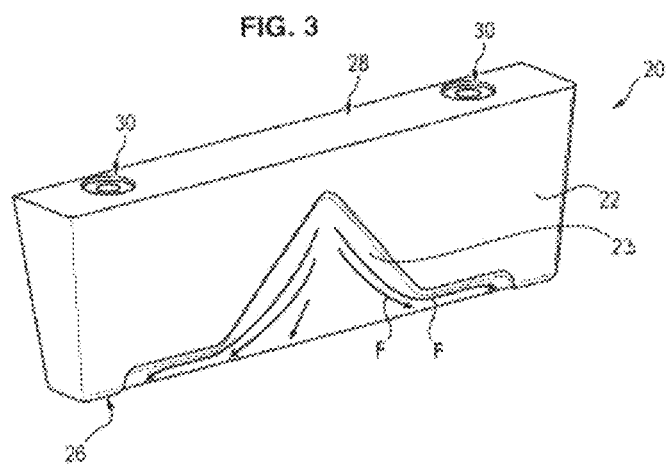
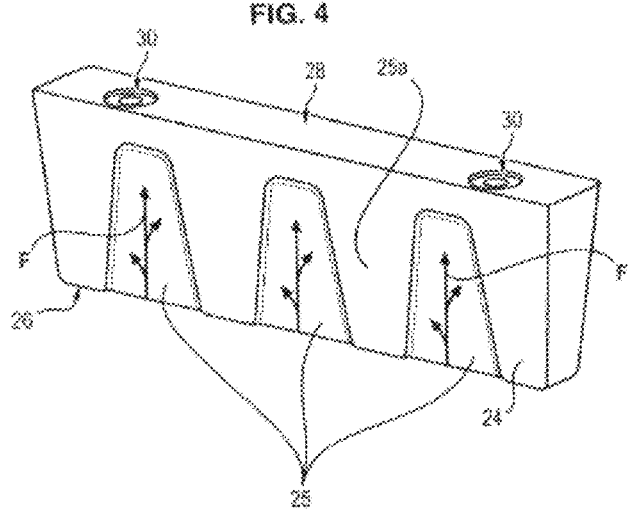

METHOD FOR MANUFACTURING A TURBINE ENGINE PART BY INJECTION OF RESIN UNDER PRESSURE

BACKGROUND OF THE INVENTION

Field of the Invention

The invention relates to a method for manufacturing a thick turbine engine part, by using a method with injection of resin under pressure, such as an RTM (for Resin Transfer Molding) method.

In particular, the invention advantageously finds application for the manufacturing of rocket engine or aircraft engine parts, more particularly for making thick parts in a composite material with fiber reinforcements and a resin matrix, notably composite blades of turbine engine compressors.

Description of the Related Art

The RTM method is a method currently used in the manufacturing of aeronautical parts. It consists in making a preform in fibers, generally woven fibers, which is set into place in a closed mold where it receives by low pressure injection, a thermosetting resin with relatively low viscosity. The main steps of the method are placing the fiber preform in the mold, filling the mold by injection, polymerizing the resin and removing the obtained part from the mold.

For example, in the case of fan blades for turbine engines, a yarn or fiber structure is woven in order to produce a preform which will be used as a structural reinforcement for the parts. As an example, reference may be made to the methods for making preforms in woven yarns or fibers described in documents EP 1 526 285, FR 2 861 143 or FR 2 892 339, in the name of the applicant.

The three-dimensional preform is then placed in a mold inside an installation for injecting resin under pressure. Such an installation notably comprises an enclosure forming an autoclave inside which the mold containing the preform is positioned, a resin injection system connected to the mold via an injection channel, means, if necessary, for pressuring the resin composition and a vacuum source connected to the mold via a partial vacuum channel. In this way, a resin composition may be introduced under pressure at one end of the mold, for example at the base of the latter, and may advance towards another end of the mold, for example upwards, under the action of the partial vacuum established in the mold possibly completed with overpressure upon the arrival of the resin composition.

After injection of the resin, a polymerization step in the mold is carried out by applying given temperature and pressure profiles to the mold. The thereby obtained part is then cooled and then removed from the mold.

However, the step for removal from the mold recurrently has difficulties in extracting the molded part, which increase in the case of parts having large thicknesses such as the fans of turbine engines, in the area of their foot. In particular, due to the variation of the expansion between the mold and the blade during the cooling of the blade, the blade may remain blocked in the mold. This blocking is further reinforced by the presence of the injection channel which crosses the mold and supplies the preform with resin, directly from the foot of the blade (generally in its centre). After solidification, the polymerized resin present in this blocked channel actually blocks the part and should therefore be broken so as to be able to extract it from the mold.

This operation is generally carried out by means of a spatula with a sharp edge, which, in addition to severing the injection channel, when it is slipped under the part, gives the possibility of forcing its extraction.

These extraction conditions nevertheless locally damage the part and the mold, and represent a non-negligible waste of time considering the number of parts which generally have to be made.

Therefore, the creation of a large draft in the mold in the area adjacent to the injection channel was therefore proposed, i.e. typically at the foot area of the blade, in order to simplify its extraction.

However, the draft creates a pure resin area on the part which should then be mechanically removed in order to make the blade geometrically conform and to give it the intended dimensions, and not to perturb the subsequent machining operations. Moreover, it was observed that the inclined plane of the draft promoted deformation of the three-dimensional preform during its placement in the mold. Finally, making the draft does not give the possibility of solving the problems related to polymerization of the resin in the injection channel.

In document FR 2 892 339, it was also proposed to place shims at the edge of the mold and to first remove them before injection, during the cooling in order to avoid inducing stresses and embrittlement of the blade. However, the shape of the shims has to be adapted to each location where it is inserted, and thus does not give the possibility of solving the problems related to polymerization of the resin composition in the injection channel, so that the making of the draft remains necessary.

Document WO 2007/054615, as for it, proposes a method for manufacturing a part in composite material by injection of resin under pressure of the RTM type, applied by means of a tool notably comprising a chamber for storing resin, a working chamber 10 adapted for receiving the preform, and a line for transferring the resin from the storage chamber to the working chamber. The tool may further comprise a bridge fitting adapted to create a passage channel for the resin in the transfer line. However, this document does not give the possibility of solving the problem of the invention, i.e. facilitating the removal of the part from the mold. The bridge fitting is actually only used for reducing the possible air passages between both chambers.

Finally, document FR 1 520 113 describes a method for manufacturing a belt in a composite material by injecting rubber under pressure into a tool comprising a female portion, a male portion and an intermediate portion, positioned between the male portion and the female portion. The intermediate portion is crossed by a channel into which the rubber is injected, and delimits the ring-shaped internal surface of the belt. Nevertheless, this method is difficult to transpose to the manufacturing of a thick part of the turbine engine blade type, insofar that the injected composition is rubber and not a resin and therefore does not require any polymerization step.

BRIEF SUMMARY OF THE INVENTION

An object of the invention is therefore to find a remedy to all or part of the drawbacks of the state of the art and to propose a method for manufacturing a part by injection of resin under pressure, wherein extraction of the part is simplified so as to reduce the risks of blocking the part in the mold as well as deforming the manufactured part, this in spite of the possible presence of polymerized resin in the injection channel.

For this, the invention proposes a method for manufacturing a thick turbine engine part in a composite material by injection of resin under pressure, notably comprising the following successive steps:

positioning a fiber preform in a mold,
injecting a resin composition into the mold,
polymerizing the resin composition in the mold so as to obtain the part, and
removing the part from the mold,
characterized in that it further comprises,
   prior to the injection of the resin composition, a step for inserting a mold release shim between the fiber preform and a wall of the mold, and
   between the polymerization of the resin composition and the removal of the part from the mold, a step for extracting the mold release shim.

The invention also proposes a mold release shim for the manufacturing of a thick part, a turbine engine blade in a composite material with fiber reinforcements and a resin matrix obtained by means of this manufacturing method and a turbine engine comprising such a blade.

BRIEF DESCRIPTION OF THE SERVERAL VIEWS OF THE DRAWINGS

Other features, objects and advantages of the present invention will become better apparent upon reading the following detailed description, made with reference to the appended figures given as a non-limiting example and wherein:

FIG. 1 illustrates an exemplary mold for an embodiment of a blade, in a perspective view, as well as an exemplary mold release shim which may be used during a method according to the invention;

FIGS. 2a, 2b, and 2c are simplified sectional views of the mold and of the shim of FIG. 1 during the manufacturing method of the invention;

FIG. 3 illustrates an embodiment of an injection face of an exemplary embodiment of the mold release shim;

FIG. 4 illustrates an embodiment of a supporting face of an exemplary embodiment of the mold release shim.

DETAILED DESCRIPTION OF THE INVENTION

Figure 5:
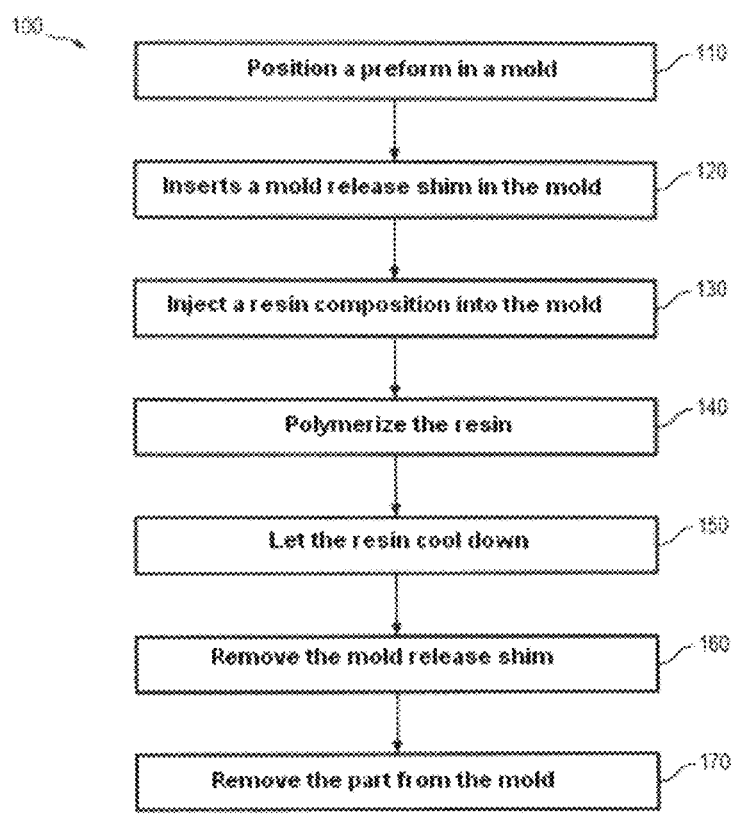
FIG. 5 is a flowchart representing different steps of an exemplary embodiment of the methods for manufacturing a part according to the invention.

A manufacturing method by injecting resin under pressure (RTM method) 100 according to the invention is described in the following for manufacturing a part in composite material comprising a matrix of fibers embedded in resin, of the turbine engine blade type. This however is non-limiting.

Moreover, since the steps of the RTM method are known, they are not described in detail. For example reference may be made to the documents FR 2 892 339 or FR 2 861 143 for more information on this method.

The manufacturing method 100 may be performed from a conventional three-dimensional preform with woven yarns or fibers, such as for example the one described in the aforementioned documents in the name of the Applicant.

The preform (not illustrated in the figures) is positioned 110 in a mold 10, which may optionally be coated beforehand with a mold release agent and/or a gel coat.

The mold 10 comprises at least one injection channel 12 crossing one of its walls 11, for example, the wall adjacent to the area intended to form the blade foot, intended to be in communication with an injection system of an installation for injecting resin under pressure (not illustrated in the figures).

In order to improve extraction of the part 1 out of the mold 10, the method comprises a step 120 for inserting a mold release shim 20 between the fibrous preform and a wall of the mold 10 prior to the injection of the resin composition.

Given that the difficulties during removal from the mold generally occur in areas of the parts having a large thickness, for example having a thickness greater than or equal to 5 cm, the mold release shim 20 is preferably inserted against a wall of the mold adjacent to one of these areas. For example, in the case of turbine blades, the shim 20 is positioned against the wall 11 of the mold intended to be facing the blade foot.

Alternatively, the mold release shim 20 may also be positioned against the wall of the mold 10 comprising the injection channel 12.

Here, the wall adjacent to the blade foot and the wall comprising the injection channel are the same so that a single mold release shim 20 is required. In the case when these walls are distinct, the introduction of a mold release shim 20 against each of these walls may be contemplated.

The mold release shim 20 has an injection face 22, intended to face the wall 11 of the mold 12, and a supporting face 24 opposite to the injection face 22, intended to face the part 1. The injection face 22 and the supporting face 24 are connected together through a lower face 26, intended to face the mold 12, and an upper face 28 opposite to the lower face 26.

The injection face 22 and the supporting face 24 form between them a draft angle of the order of about 7° to 20°. This draft angle facilitates extraction of the mold release shim 20 out of the mold during the removal of the part 1 from the mold.

The mold release shim 20 may comprise a grasping means 30, for example positioned on its upper face 28, with which grasping of the shim 20 may be simplified during the removal of the part 1 from the mold. For example, the grasping means may comprise one or several raising rings, or a slide hammer (an inertia extractor), attached on the upper surface 28 of the mold release shim 20. The shim 20 may then comprise housings intended to receive the rings or the hammer.

When the mold release shim 20 is placed facing the outlet of the injection channel, it further gives the possibility of completing the heating of the resin composition (initiated upstream from the injection channel) before the latter reaches the preform in the mold. Indeed, the resin composition should circumvent the mold release shim 20 before reaching the preform, so that along this travel, its temperature is raised by its contact with the shim 20.

In order to facilitate circumvention of the mold release shim 20 by the resin, the shim 20 may comprise guiding grooves 23, 25 on one or several of its faces 22, 24.

These guiding grooves 23, 25 may be machined in the wall(s) of the mold release shim 20, or be directly formed during the making of the shim 20, for example by molding.

For example, the shim 20 may comprise a guiding groove on the injection face 22. The guiding groove 23 may then extend from an area facing the outlet of the injection channel 12 as far as one of the lower 26 or upper 28 faces of the shim 20. The flaring towards the lower face 26 (rather than the upper face 28) has the advantage of simplifying subsequent extraction of the mold release shim 20, insofar that the polymerized resin composition does then not shut in the shim 20 in the mold.

As visible in FIG. 3, this configuration of the guiding groove 23 allows propagation of the resin composition into the groove 23 and its guiding towards the lower surface 26 of the mold release shim 20 along the arrows F. Here, the flaring of the guiding groove 23 is discontinuous and strongly enhanced in the vicinity of the lower face, so as to facilitate circumvention of the mold release shim 20 by the resin flow 40.

The shim 20 may also comprise, on the supporting face 24, at least one guiding groove 25 which extends from the lower 26 or upper 28 face of the shim 20 towards the opposite face.

Preferably, when the mold release shim 20 comprises a guiding groove also on the injection face 22, the grooves of the supporting face 24 and of the injection face 22 are adjacent to the same face of the shim 20, here the lower face 26.

Each guiding groove 25 has the function of allowing better distribution of the resin composition on the preform. Indeed, as illustrated in FIG. 4, the resin flow 40 is guided following the arrows F into the grooves 25 of the lower face 26 towards the centre of the supporting face 24, and thus impregnates the preform in a more homogeneous way.

In order to limit the risks of formation of a constriction in the injected resin flow 40, the surface area of the guiding groove(s) 25 is equal to at least 30% of the total surface area of the supporting phase 24 of the mold release shim 20, preferably between 30% and 60%, for example of the order of 50%.

Moreover, the section of the guiding grooves of the supporting face 24 is selected so as to limit pressure drops during injection. For this, the passage section of the guiding grooves 25 may for example be at least equal to the section of the outlet of the injection channel 12.

The areas 25a of the supporting face 24 protruding relatively to the guiding grooves 25, or in other words the areas 25a of the supporting face without any guiding grooves, are used as a support for the preform and allow its position to be maintained in the mold 10.

For example, the supporting face 24 may comprise three substantially identical guiding grooves 25 which flare towards the lower face 26 of the mold release shim 20, and the surface area of which covers about 50% of the total surface area of the supporting face 24. The remainder 25a of the surface of the supporting face 24, around the guiding grooves, is then used as a support for the preform.

Once the mold release shim 20 is inserted into the mold 10, the latter is then closed, placed in an autoclave, an oven or under a heating press, and connected to the different systems of the facility (not illustrated in the figures), such as the injection system, the vacuum source, etc. according to conventional RTM methods. In order to protect the housings intended for receiving the grasping means during the step for injecting the resin composition, o-ring gaskets may be placed in said housings.

The mold 10 is then heated and the resin composition is injected in 130 and then maintained under pressure at the end of the filling of the mold 10.

Finally, the resin composition is polymerized 140 and then cooled 150 so as to obtain the part 1.

The part 1 may then be removed from the mold.

For this, the mold release shim 20 is first extracted 160 from the mold 10. Given that the resin remains at the periphery of the shim 20 during its injection (by the different guiding grooves 23, 25 if necessary), the mold release shim 20 may be removed from the mold 10 without any effort and without remaining adhered to the polymerized (and therefore solidified) resin composition.

Moreover, when the shim 20 comprises at least one guiding groove 23, 25 on the injection wall 22 and/or the supporting wall 24, the polymerized resin composition which was located in the different grooves 23, 25 is set in this position by the polymerization and therefore remains in the mold 12 (see FIG. 2c). It is actually retained by the injection channel 12 on the one hand and by the part 1 on the other hand.

According to an embodiment, the depth of the grooves 23 and 25 is selected so that this portion of the resin composition which is pure (i.e. without any fibrous structure), easily yields upon removing the part 1 from the mold. For example, the guiding grooves 23, 25 (of the injection wall 22 or of the supporting wall 24) may have a maximum depth of the order of 0.5 mm. The breaking of the resin composition then occurs at the breaking points localized at the interface with the part 1 and at the outlet of the injection channel.

The mold release shim 20 is made in the same material as the mold.

The implementation of such a mold release shim 20 upon making the part thus allows limitation or even suppression of the risks of damaging parts with large thicknesses (i.e. greater than about 5 mm) which have blocking risks during removal from the mold, in particular turbine engine parts such as blades. The use of extraction tools is further no longer necessary and the removal of the part from the mold is faster, of the order of less than one minute for a turbine engine blade, versus about 15 minutes for conventional manufacturing methods. Finally, the difficulties for extracting the parts due to the presence of polymerized resin in the injection channel 12 of the mold 10 are circumvented by the interposition of the shim 20 between the preform and the wall 1 of the mold and of its optional guiding grooves 23 and 25.

The invention claimed is:

1. A method for manufacturing a thick turbine engine part in a composite material by injection of resin under pressure, comprising the following steps:
   positioning a fiber preform in a mold,
   injecting a resin composition into the mold,
   polymerizing the resin composition in the mold so as to obtain the part, and
   removing the part from the mold, wherein the method further comprises:
   prior to the injection of the resin composition, inserting a mold release shim between the fiber preform and a wall of the mold, said mold resin shim having two opposite faces converging towards a second face adapted for being positioned at the bottom of the mold, so as to form with the wall a non-zero draft angle, and
   between the polymerization of the resin composition and the removal of the part from the mold, extracting the mold release shim,
   wherein the wall of the mold comprises a channel for injecting the resin composition into the mold,
   wherein the mold release shim comprises at least one face having at least one guiding groove for guiding the injection resin composition, in order to facilitate circumvention of the mold release shim by the resin composition during the injection step, and
   wherein the at least one face having the at least one guiding groove is positioned in front of the injection channel.

2. The manufacturing method according to claim 1, wherein the at least one guiding groove is flared towards a second face of the mold release shim adapted so as to be placed at a bottom of the mold.

3. The manufacturing method according to claim 1 wherein a guiding groove is also positioned on the mold release shim face in front of the part, and a surface area of the guiding groove of the face in front of the part covers between 30% and 60% of a total surface area of said face.

4. The manufacturing method according to claim 1, wherein the draft angle is comprised between 7° and 20°.

5. A method for manufacturing a thick turbine engine part in a composite material by injection of resin under pressure, comprising the following steps:
  positioning a fiber preform in a mold,
  injecting a resin composition into the mold,
  polymerizing the resin composition in the mold so as to obtain the part, and
  removing the part from the mold,
  wherein the method further comprises:
  prior to the injection of the resin composition, inserting a mold release shim between the fiber preform and a wall of the mold, said mold resin shim having two opposite faces converging towards a second face adapted for being positioned at the bottom of the mold, so as to form with the wall a non-zero draft angle, and
  between the polymerization of the resin composition and the removal of the part from the mold, extracting the mold release shim,
  wherein the wall of the mold comprises a channel for injecting the resin composition into the mold,
  wherein the mold release shim comprises at least one face having at least one guiding groove for guiding the injection resin composition, in order to facilitate circumvention of the mold release shim by the resin composition during the injection step, and
  wherein the at least one guiding groove is flared towards a second face of the mold release shim adapted so as to be placed at a bottom of the mold.

6. The manufacturing method according to claim 5, wherein the at least one face having the at least one guiding groove is positioned in front of at least one of the injection channel and the part.

7. The manufacturing method according to claim 5, wherein the draft angle is comprised between 7° and 20°.

* * * * *